United States Patent [19]

Honda et al.

[11] 4,285,032
[45] Aug. 18, 1981

[54] TUBULAR INCANDESCENT LAMP

[75] Inventors: Kiyokazu Honda, Zushi; Yoshiji Yoshiike, Yokosuka; Katsuo Muraki, Imabari; Teruyoshi Kawamata, Touyo, all of Japan

[73] Assignees: Tokyo Shibaura Denki Kabushiki Kaisha, Kawasaki; Harison Electric Co., Ltd., Imabari, both of Japan

[21] Appl. No.: 62,149

[22] Filed: Jul. 30, 1979

[30] Foreign Application Priority Data

Aug. 7, 1978 [JP] Japan .......................... 53/107450[U]

[51] Int. Cl.³ .................................................. F21S 3/00
[52] U.S. Cl. .................................... 362/224; 313/316; 313/324; 362/11; 362/219; 362/225; 362/240
[58] Field of Search ................. 362/11, 219, 224, 225, 362/240; 313/272, 273, 316, 324

[56] References Cited

U.S. PATENT DOCUMENTS

| 3,633,023 | 1/1972 | Castiglioni | 362/219 |
| 4,020,335 | 4/1977 | Bisceglia | 362/224 |
| 4,070,594 | 1/1978 | Fuchi | 362/225 |

*Primary Examiner*—Donald P. Walsh
*Attorney, Agent, or Firm*—Cushman, Darby & Cushman

[57] ABSTRACT

A tubular incandescent lamp which comprises an elongate transparent envelope; and a plurality of small lamps linearly arranged and extending lengthwise through the envelope, each of said small lamps containing a helically coiled filament and wherein the difference between the inner diameter of the envelope and the outer diameter of the respective lamps is chosen to be 2 mm or less.

2 Claims, 3 Drawing Figures

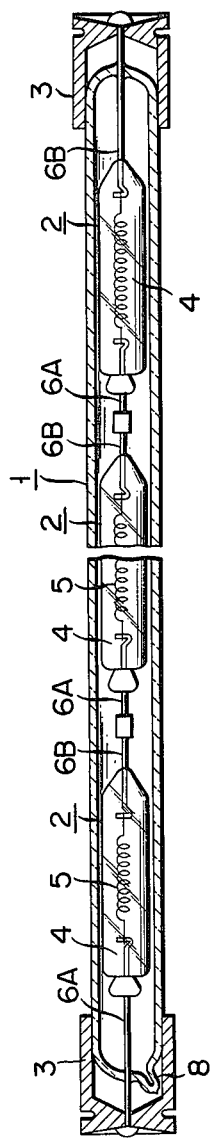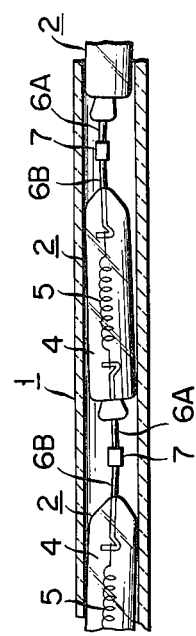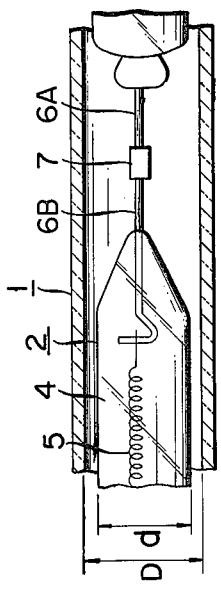

TUBULAR INCANDESCENT LAMP

BACKGROUND OF THE INVENTION

This invention relates to a tubular incandescent lamp and more particularly to a tubular incandescent lamp favorably applied to an electronic copying machine for ordinary paper.

With a copying machine based on the principle of electrophotography or xerography, a static latent image is formed on the photoelectric surface of a transcription selenium drum. After the image is covered with toner powder, the latent image is developed. The developed image is then transcribed on ordinary paper. After completion of transcription, a cleaning step is taken which irradiates light beams on the photoelectric surface of the selenium drum for discharge in order to remove toner powder still remaining on the surface. A fluorescent lamp is generally used as a source of light for this cleaning step. However, the fluorescent lamp requires a stabilizer and is expensive. Moreover, the circuit of a microcomputer installed in the recent type of copying machine is harmfully affected by pulses issued when the fluorescent lamp is lighted. For this reason, an incandescent lamp has come to be used as a source of light for the removal of toner powder remaining on the photoelectric surface of the transcription selenium drum. An incandescent lamp used for this particular purpose includes the type formed by placing one long lengthwise extending helically coiled filament in a narrow tubular bulb, and the type constructed by linearly arranging a plurality of short helically coiled filaments in a narrow bulb. However, these types of incandescent lamp have the drawbacks that they have low resistance to shocks and vibrations, release a great deal of heat to increase the temperature of the photoelectric surface of the tran111
scription selenium drum, possibly leading to a decline in the performance of said selenium drum. Accordingly, the present inventors previously proposed a tubular incandescent lamp. This proposed tubular incandescent lamp comprised a plurality of small lamps linearly arranged and extending lengthwise through a narrow transparent tubular envelope. This proposed incandescent lamp had the advantages that it had high resistance to shocks and vibrations, and released a relatively small amount of heat, ensuring a small rise in the temperature of the photoelectric surface of the transcription selenium drum. Later, however, it was found that while the proposed incandescent lamp was used, the angles which light beams emitted from the plural small lamps defined with the lateral walls of the envelope of the incandescent lamp were displaced from the prescribed direction, thereby resulting in wide variations in the intensity of light beams projected from the small lamp to the photoelectric surface of the transcription selenium drum. Such undesirable event should be avoided.

SUMMARY OF THE INVENTION

It is accordingly the object of this invention to provide a tubular incandescent lamp which has high resistance to shocks and vibrations, releases a relatively small amount of heat, and, during operation, is saved from the derangement of illumination on the photoelectric surface of a transcription selenium drum.

To attain the above-mentioned object, the invention provides a tubular incandescent lamp which comprises an elongate transparent tubular envelope and a plurality of small lamps linearly arranged and extending lengthwise through said envelope, each of said small lamps containing a helically coiled filament, and wherein a difference between the inner diameter of the tubular envelope and the outer diameter of the respective small lamps is 2 mm or less.

BRIEF DESCRIPTION OF THE DRAWINGS

FIG. 1 is a sectional view of a tubular incandescent lamp embodying this invention;

FIG. 2 is a fractional enlarged sectional view of the main section of FIG. 1; and FIG. 3 is a fractional sectional view of the subject tubular incandescent lamp illustrating its function.

DESCRIPTION OF THE PREFERRED EMBODIMENT

There will now be described by reference to FIGS. 1 to 3 the arrangement and operation of a tubular incandescent lamp embodying this invention. Reference numeral 1 denotes an elongate tubular transparent glass envelope sealed at both ends. The envelope contains a plurality of small lamps 2 linearly arranged and extending in the lengthwise direction. Both ends of the envelope are fitted with mouthpieces 3. These mouthpieces 3 are connected to the respective small lamps 2 by means of the later described soldered lead lines. Each small lamp 2 comprises a shell-shaped glass bulb 4, a lengthwise extending helically coiled filament 5 sealed in the bulb 4, and two lead lines 6A, 6B connected to both ends of the filament 5 and drawn out from both ends of the bulb 4. Reference numeral 7 denotes a solder for fixing the lead lines 6A, 6B in position. The small lamps 2 are linearly connected by means of the solder 7. The lead line 6A of a small lamp 2 set at one end of the envelope 1 is connected to the corresponding mouthpiece 3. The lead line 6B of a small lamp 2 disposed at the other end of the envelope 1 is connected to the corresponding mouthpiece 3. A projection 8 formed at one end of the envelope 1 denotes an air discharge pipe through which air in the envelope 1 was drawn off for evacuation. The tubular incandescent lamp of this invention constructed as described above is characterized in that a difference between the inner diameter of the envelope 1 and the outer diameter of the respective small lamp is chosen to be 2 mm or less. In FIG. 2, the inner diameter of the envelope 1 is indicated by D, and the other diameter of the respective small lamp 2 is denoted by d. As customarily practised in the manufacture of an incandescent lamp, the small lamps 2 sealed in the envelope 1 are subjected to aging which is carried out by impressing a voltage having a level equal to, for example, 110% of that which is used in normal illumination purpose. This aging treatment leads to the elongation of the lead lines 6A, 6B. As a result, the respective small lamps 2 are inclined, as illustrated in FIG. 3, causing part of the surface of the bulbs 4 to touch the inner wall of the envelope 1. The angle of said inclination is gradually broadened, while the incandescent lamp is repeatedly lighted and extinguished during practical application within the range of the aforesaid difference between D and d. If, in this case, said difference is larger than 2 mm, then the small lamps 2 tend to be inclined at an excessively broad angle in the envelope 1. As a result, the angle which the irradiated light beams define with the photoelectric surface of the transcription selenium drum is displaced from the prescribed range, giving rise to noticeable variations in the intensity of illumination on said photoelectric surface. Where, however, the difference between D and d falls within the range of 2 mm, then the above-mentioned derangement of illumination on the photoelectric surface of the selenium drum does not arise. Conversely, where the difference between D and d approaches zero, then the outer surface of the bulbs 4 of the respective small lamps 2 touches the inner wall of the envelope 1 in larger areas, resulting in an increase in heat release and the deterioration of the photoelectric function of the selenium drum, and presenting difficulties in smoothly inserting the small lamps 2 into the envelope 1. Therefore, a lower limit to the difference between D and d is preferred to be 1 mm or over.

There will now be described by reference to the following experiment the advantageous effect of a tubular incandescent lamp ambodying this invention.

A large number of small lamps 2 having an outer diameter of 6.2 mm and a rated capacity of 8 V and 0.3 A were provided. Twelve small lamps of the above-mentioned type were connected in series in each of a plurality of envelopes 1 having various inner diameters. A plurality of sample tubular incandescent lamps were manufactured by sealing the envelopes 1. Where the efficiency of each sample incandescent lamp was so designed as to provide an average life of 10,000 hours, then the total luminous flux amounted to about 15 lumens. With the sample incandescent lamps thus designed, the intensity of illumination on the photoelectric surface of the selenium drum 25 mm apart from the envelope 1 of the sample incandescent lamp indicated about 2500 luxes. With a difference between D and d slightly increased over 2 mm, the intensity of illumination on the photoelectric surface of the selenium drum was found to fall by 6%.

Those of above-mentioned sample incandescent lamps in which a difference between D and d was chosen to be 2 mm or less in accordance with the method of this invention proved to resist a shock having a force five times the gravitational force (5 G).

We claim:

1. A tubular incandescent lamp for illuminating an adjacent surface which comprises:
    an elongate transparent envelope; and
    a plurality of small lamps linearly arranged and extending lengthwise through the envelope, each of said small lamps containing a helically coiled filament and lead lines for connecting the filament of each lamp to at least one adjacent lamp, said lead lines elongating in use so that said lamps incline in said envelope, and wherein the difference between the inner diameter of the envelope and the outer diameter of the respective small lamps is 2 mm or less to limit the inclination of said lamps and thus to limit variations in intensity of illumination from said lamps onto said surface.

2. The tubular incandescent lamp according to claim 1, wherein a difference between the inner diameter of the envelope and the outer diameter of the respective small lamps is chosen to be 1 to 2 mm.

* * * * *